No. 875,034. PATENTED DEC. 31, 1907.
E. R. WRIGHT.
TRIPOD HEAD.
APPLICATION FILED APR. 15, 1907.
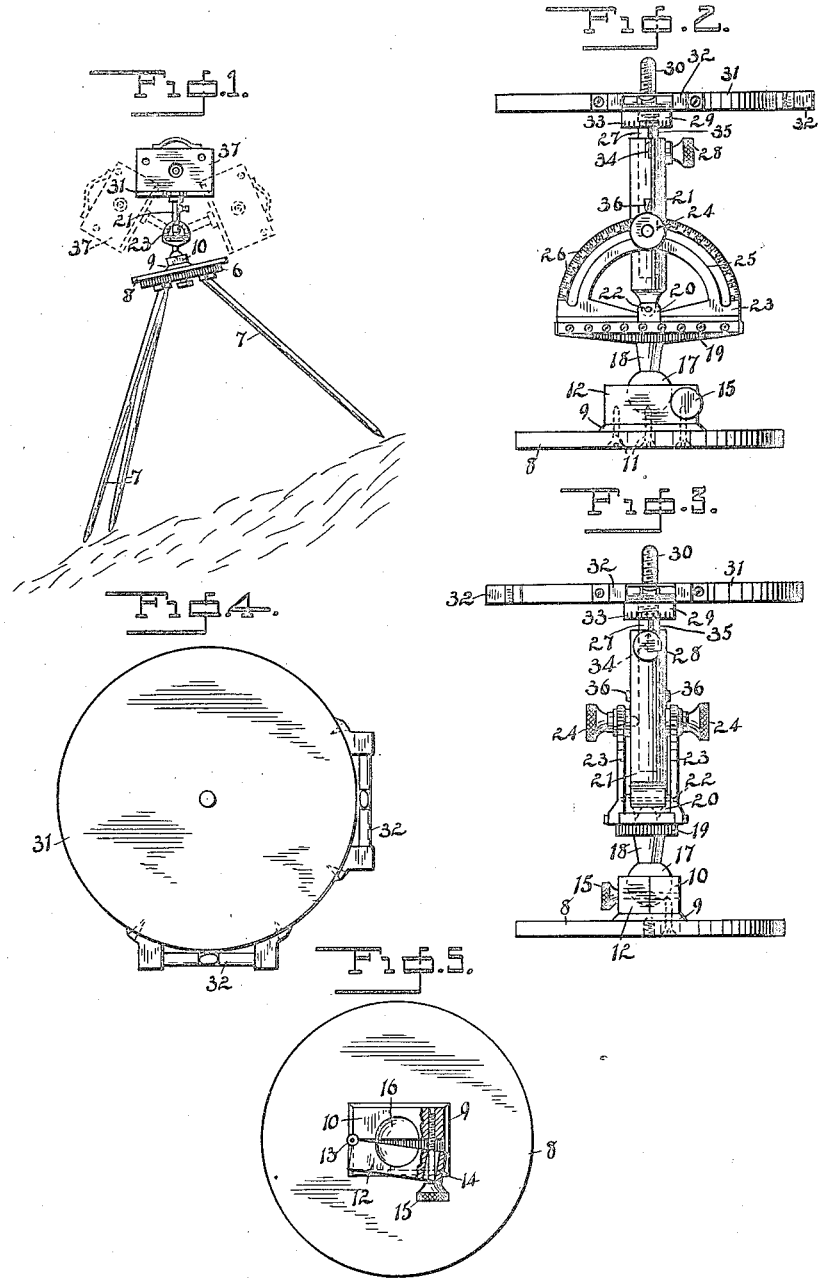
WITNESSES:
Mathew J. Marty
C. F. Bassett
INVENTOR
Emmett R. Wright
BY Frederick Benjamin
ATT'Y.

UNITED STATES PATENT OFFICE.

EMMETT R. WRIGHT, OF PARK CITY, UTAH.

TRIPOD-HEAD.

No. 875,034.            Specification of Letters Patent.            Patented Dec. 31, 1907.

Application filed April 15, 1907. Serial No. 368,131.

*To all whom it may concern:*

Be it known that I, EMMETT R. WRIGHT, a citizen of the United States, residing at Park City, in the county of Summit and State of Utah, have invented certain new and useful Improvements in Tripod-Heads, of which the following is a specification.

My invention relates to photographic cameras and refers especially to means for attaching the camera to the tripod, such device constituting the tripod head.

The chief objects of my invention are to provide an adjustable tripod head that will be adapted to receive and hold a camera of any size within its capacity; to furnish means for readily and easily attaching and removing the camera stand; to provide a universal joint between the stand and camera holder so that the axis of the lens may be inclined at any angle either vertical or horizontal and furnishing mechanism for securing the instrument in such combined radial and axial adjustment.

Further objects of my improvements are to furnish suitable graduations for indicating the angles of inclination and to provide convenient leveling means for the camera plate.

I accomplish the above and other objects of less importance by means of the appliance illustrated in the accompanying drawing which forms a part of this specification, and in which:—

Figure 1 is a side elevation of a camera and stand fitted with my improved combination tripod head, showing its adaptability for use upon uneven ground; Figs. 2 and 3 are elevational views of the tripod head observed in directions varying 90 degrees from each other, the tripod and camera being removed; Fig. 4 is a plan view of the top plate, and Fig. 5 is a top plan view of the bottom plate showing the socket box partially opened.

Referring to the drawing in detail, the numeral 6 indicates the plate and 7 the legs of a tripod of usual construction. Upon said plate 6 is located a circular base plate 8 for the head proper, a threaded socket being provided upon the under side to receive the standard screw of the tripod plate. Upon the upper surface of said plate 8 is formed a central boss 9, upon which is secured a socket block 10 by screws 11 which are inserted from the under surface of the plate 8. A companion block 12 is pivoted to the block 10 by a hinge 13 and said block 12 is provided with a slot 14 through which passes an adjusting screw 15 which has a threaded engagement with the block 10. The contiguous surfaces of said blocks 10 and 12 are furnished with semispherical sockets 16 to receive a ball 17 formed with a stem 18 which is pendent from an oblong plate 19. Fixed to the upper side of said plate are ears or brackets 20 to which is mounted a round post 21 by a pivot 22. To each side of the plate 19 is secured an arc or sector 23, adjustably secured to the post 21 by a thumb screw 24 which passes through a semicircular slot 25. The peripheral margin of the sectors are provided with graduations 26 for indicating the angular relation of the plane of the plate 19 and the axis of the post 21. The said post 21 is provided with a longitudinal bore which extends nearly to the pivotal end and is adapted to receive with a sliding fit a rod 27, a thumb screw 28 serving to adjust said rod at different heights in the post.

The upper end of the rod 27 is reduced in size and provided with threads 30 which engage a boss 29 and plate 31, the latter being circular in form and herein designated as the top plate. To the margin of this plate are secured spirit levels 32, located 90 degrees apart. The periphery of the boss 29 is furnished with graduations 33 and upon the outside of the post 21 are indicating marks in the form of arrows 34, placed at intervals of 90 degrees about said post, to designate the said graduations when the rod and plate are rotated axially in the post 21. Longitudinal leading lines 35 are engraved or otherwise impressed upon the rod 27 in order that the relation of the indicating arrows 34 to the graduations 33 may be easily determined when the plate 31 and boss 29 are raised a considerable distance above the upper end of the post 21.

Upon opposite sides of the post 21 in close proximity to the arcs 23 are located indicating points 36 by means of which the angles of inclination of said post may be quickly read.

The upper end 30 of the rod 27 is provided with a standard thread to receive the camera 37. The combined action of the various points permits of a wide range in the positions in which the camera may be placed, and the various indicating scales described permit of the restoration of such positions when the readings have been preserved.

By reference to Fig. 1 it will be seen that the inclination of the camera axis may be varied through an angle of approximately 180 degrees, while the ball and socket joint at the bottom plate and the ginglemoid joint at 22 combine to permit an infinite variety of inclinations in any direction and enable the operator to level the instrument when he so desires, whatever the inclination of the tripod plate within a wide limit.

It is obvious that certain variations may be made in the devices of my invention as herein disclosed without departing from the spirit and scope thereof, and I do not wish, therefore, to be limited to the precise construction set forth.

Having thus described my invention, I claim:—

1. A tripod head, including a base-plate, a supporting plate connected with said base-plate by a universal joint, a hollow post pivotally mounted upon said supporting plate, means for adjusting said post upon its pivot, a leveling plate, a stem for the leveling plate adapted to engage the bore of said hollow post, and means for adjusting said stem longitudinally in said post.

2. A tripod head including a base-plate, a supporting plate connected with said base plate by a universal joint, a hollow post pivotally mounted upon said supporting plate, graduated sectors carried by said supporting plate, adjusting screws connecting said post with the sectors, a leveling plate provided with a stem adapted to engage the bore of said hollow post, and means for adjusting said stem axially and rotatably in said post.

3. A tripod head, including a base plate, a supporting plate connected with said base plate by means of a universal joint, a hollow post pivotally mounted upon said supporting plate, graduated sectors carried by said supporting plate, adjusting screws connecting said post with the sectors, a leveling-plate provided with a graduated stem adapted to engage the bore of said hollow post, a graduated boss attached to the said leveling plate concentric with the stem, and means for adjusting said stem axially and rotatably in said post.

4. In a tripod head, the combination with a base-plate, of a leveling plate, a connecting member between said plates, said member consisting of a supporting plate connected to the base plate by a universal joint, a post pivoted to said supporting plate, and means for varying the distances between the centers of said base and leveling plates.

5. In a tripod head, the combination with a base-plate, of a leveling plate, a member connecting said plates, said member consisting of a supporting plate connected by a universal joint to the base plate, a post pivoted to said supporting plate, means for adjusting said post upon its pivot, means for varying the distance between the centers of said base and leveling plates, and means for rotatably adjusting said leveling plate relatively to the supporting plate.

In testimony whereof I affix my signature in the presence of two witnesses.

EMMETT R. WRIGHT.

Witnesses:
  JOSEPH R. QUINN,
  ROBERT D. WRIGHT.